United States Patent
Voronov et al.

(10) Patent No.: US 10,620,136 B2
(45) Date of Patent: Apr. 14, 2020

(54) PATTERNING APPARATUS AND OPERATING METHOD THEREOF

(71) Applicant: SAMSUNG DISPLAY CO., LTD., Yongin-si, Gyeonggi-do (KR)

(72) Inventors: Alexander Voronov, Yongin-si (KR); Gyoo Wan Han, Yongin-si (KR); Ku Hyun Kang, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 23 days.

(21) Appl. No.: 15/825,842

(22) Filed: Nov. 29, 2017

(65) Prior Publication Data

US 2018/0149604 A1    May 31, 2018

(30) Foreign Application Priority Data

Nov. 30, 2016    (KR) .......................... 10-2016-0162103

(51) Int. Cl.
*B23K 26/03*    (2006.01)
*G01N 21/95*    (2006.01)
(Continued)

(52) U.S. Cl.
CPC ......... *G01N 21/956* (2013.01); *B23K 26/032* (2013.01); *B23K 26/359* (2015.10); *G01N 2021/9513* (2013.01)

(58) Field of Classification Search
CPC ... G01N 21/956; B23K 26/359; B23K 26/032
(Continued)

(56) References Cited

U.S. PATENT DOCUMENTS 3,526,505 A * 9/1970 Kroemer .................. G03H 1/00
                                                    257/E21.028
5,067,812 A * 11/1991 Sugimura ........ G01N 21/95623
                                                    356/237.5
(Continued)

FOREIGN PATENT DOCUMENTS

| KR | 10-2013-0028591 A | 3/2013 |
| KR | 10-1391448 B1 | 4/2014 |
| KR | 10-2015-0030523 A | 3/2015 |

OTHER PUBLICATIONS

Yasumasa Nakashima et al., "Development of in-process monitoring technique in YAG laser welding", May 2003, pp. 160-165 First International Symposium on High-Power Laser Macroprocessing. Proc. SPIE vol. 4831.

(Continued)

*Primary Examiner* — Isiaka O Akanbi
(74) *Attorney, Agent, or Firm* — Kile Park Reed & Houtteman PLLC

(57) ABSTRACT

A patterning apparatus includes a laser generator, at least one lens, a detector, and a controller. The laser generator generates a first laser beam and a second laser beam having different intensities. The at least one lens irradiates the first laser beam to form a pattern in a substrate, irradiates a second laser beam to determine a defect of the pattern, and condenses reflected beams generated as the second laser beam is reflected from the substrate. The detector converts the reflected beams to electrical signals. The controller determines a defect of the pattern based on the electrical signals.

20 Claims, 6 Drawing Sheets

(51) Int. Cl.
*G01N 21/956* (2006.01)
*B23K 26/359* (2014.01)

(58) Field of Classification Search
USPC .......................................... 356/237.2–237.6
See application file for complete search history.

(56) References Cited

U.S. PATENT DOCUMENTS

| | | | | |
|---|---|---|---|---|
| 5,272,501 A * | 12/1993 | Nishi | ................... | G03F 9/7049 355/43 |
| 5,459,794 A * | 10/1995 | Ninomiya | ............ | G01B 11/022 348/126 |
| 7,619,664 B2 * | 11/2009 | Pollard | ............. | H04N 1/00835 348/241 |
| 7,663,745 B2 * | 2/2010 | Zaman | ............... | G01N 21/8422 356/237.2 |
| 7,859,274 B2 | 12/2010 | Kim et al. | | |
| 8,648,277 B2 | 2/2014 | Alpay et al. | | |
| 2003/0002735 A1 * | 1/2003 | Yamamoto | ............... | H04N 1/58 382/167 |
| 2003/0036680 A1 | 2/2003 | Black | | |
| 2006/0003240 A1 * | 1/2006 | Shim | ...................... | G03F 7/203 430/30 |
| 2010/0188660 A1 * | 7/2010 | Palumbo | ................ | G01N 21/49 356/432 |
| 2011/0037964 A1 * | 2/2011 | Imamura | .................. | G01C 3/24 356/3.13 |
| 2014/0267702 A1 * | 9/2014 | Profitt | .................. | G01B 11/022 348/136 |
| 2015/0204796 A1 * | 7/2015 | Nagahama | ......... | G01N 21/8806 356/237.5 |
| 2016/0370300 A1 * | 12/2016 | Ogawa | ............... | G01N 21/8851 |

OTHER PUBLICATIONS

Rolland Zeleny, "Scanning the Scene", May 2004, pp. 30-32, Nutfield Technology Inc, Tutorial SPIE's oemagazine.

* cited by examiner

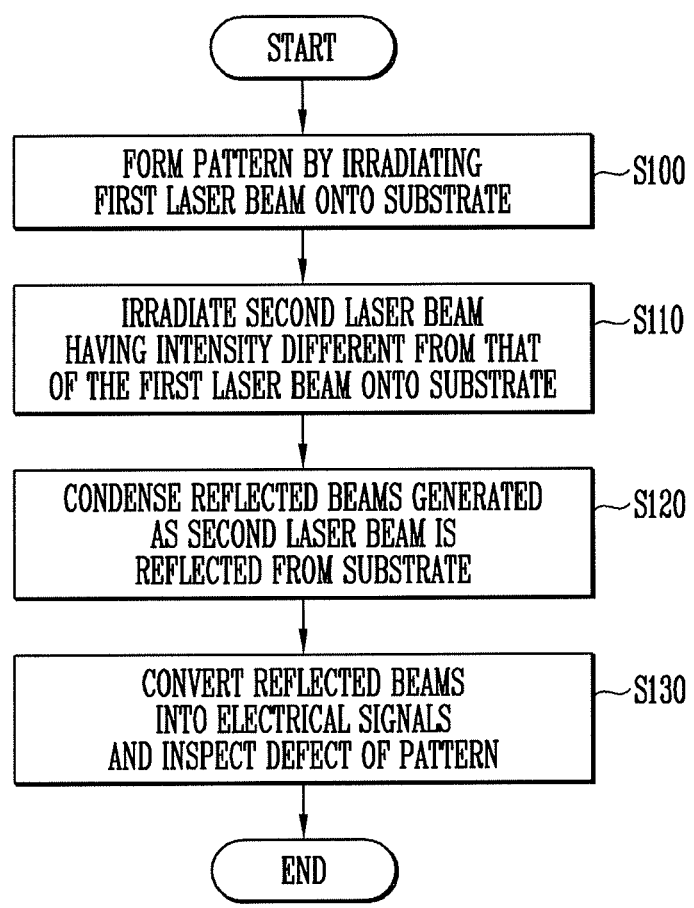

PATTERNING APPARATUS AND OPERATING METHOD THEREOF

CROSS-REFERENCE TO RELATED APPLICATION

Korean Patent Application No. 10-2016-0162103 filed on Nov. 30, 2016, and entitled, "Patterning Apparatus and Operating Method Thereof," is incorporated by reference herein in its entirety.

BACKGROUND

1. Field

One or more embodiments described herein relate to a patterning apparatus and a method for operating a patterning apparatus.

2. Description of the Related Art

A variety of displays have been developed. Examples include liquid crystal displays, plasma display panels, field emission displays, organic light emitting displays, and electrophoretic displays. These and other displays have various patterns formed on display panels and/or touch panels. A process may be performed to inspect for defects in the patterns in order to prevent deterioration in the quality of the displays.

SUMMARY

In accordance with one or more embodiments, a patterning apparatus includes a laser generator to generate a first laser beam and a second laser beam having different intensities; at least one lens to irradiate the first laser beam to form a pattern in a substrate, to irradiate a second laser beam to determine a defect of the pattern, and to condense reflected beams generated as the second laser beam is reflected from the substrate; a detector to convert the reflected beams to electrical signals; and a controller to determine a defect of the pattern based on the electrical signals.

The reflected beams may be generated as the second laser beam is reflected. The first laser beam may have an intensity greater than the second laser beam. The at least one lens may irradiate the first and second laser beams along a same route. The at least one lens may irradiate the first laser beam onto the substrate during a first period and may irradiate the second laser beam onto the substrate during a second period different from the first period. The at least one lens is to irradiate the first laser beam and the second laser beam may be at a same position on the substrate. The at least one lens may irradiate the second laser beam onto each of a plurality of second areas adjacent to a first area on the substrate onto which the first laser beam is irradiated.

The detector may convert first reflected beams generated as the second laser beam is reflected from the second areas to first electrical signals with respect to the second areas. The controller may measure intensities of the first reflected beams based on the first electrical signals, and is to detect a position of the pattern based on position coordinates of the second areas and the intensities of the first reflected beams. The detector may include a photo diode. The controller may generate an image based on the electrical signals and is to determine the defect of the pattern by analyzing the image. The image may be a raster image.

The patterning apparatus may include a beam distributor to transmit the first and second laser beams emitted from the laser generator to the at least one lens, to refract the reflected beams emitted from the at least one lens, and to output the refracted reflected beams to the detector.

In accordance with one or more other embodiments, a method for operating a patterning apparatus includes irradiating a first laser beam to form a pattern in a substrate; irradiating a second laser onto the substrate, the first and second laser beams having different intensities; condensing reflected beams generated as the second laser beam is reflected from the substrate; converting the reflected beams to electrical signals; and inspecting a defect of the pattern based on the electrical signals.

The first and second laser beams may be irradiated on a same axis. The first and second laser beams may be irradiated onto a first area on the substrate. The method may include generating an image with respect to the first area based on the electrical signals, wherein inspecting the defect includes analyzing the image. The second laser beam may be irradiated onto each of a plurality of second areas adjacent to a first area on the substrate onto which the first laser beam is irradiated. First reflected beams may be generated as the second laser beam is reflected from the second areas are converted to first electrical signals with respect to the second areas. The method may include measuring intensities of the first reflected beams based on the first electrical signals; and detecting a position of the pattern based on position coordinates of the second areas and the intensities of the first reflected beams.

BRIEF DESCRIPTION OF THE DRAWINGS

Features will become apparent to those of skill in the art by describing in detail exemplary embodiments with reference to the attached drawings in which:

FIG. 6 illustrates another embodiment of a method for operating a patterning apparatus.

DETAILED DESCRIPTION

Figure 1:
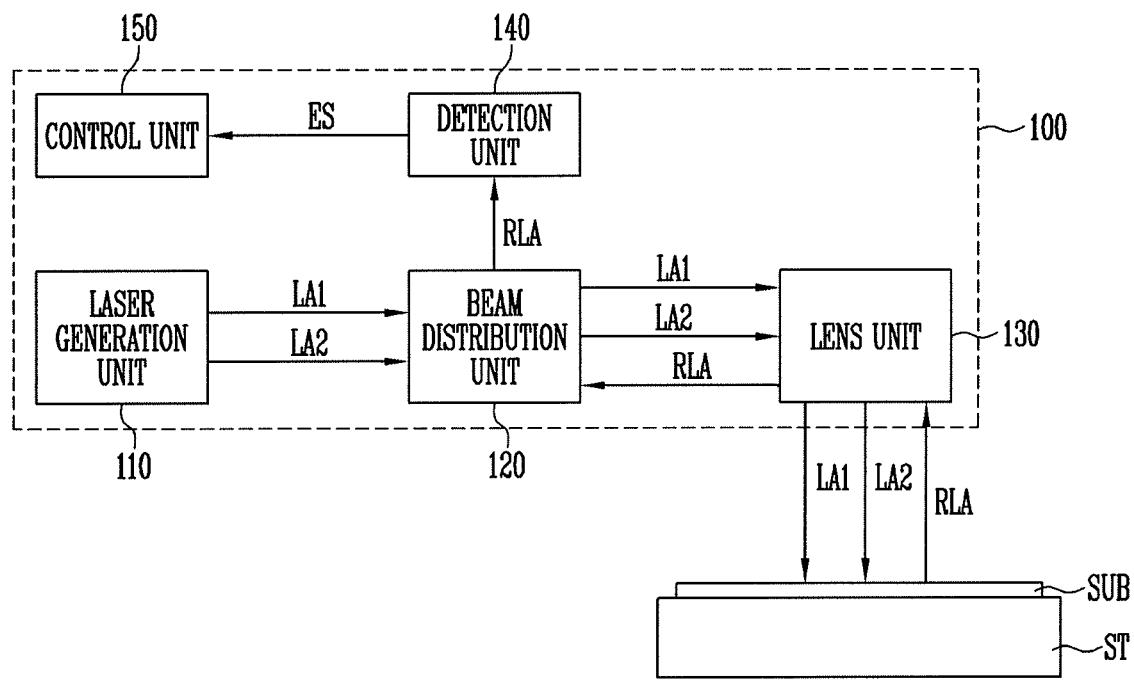
FIG. 1 illustrates an embodiment of a patterning apparatus.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a patterning apparatus 100, which may form a pattern by irradiating a first laser beam LA1 onto a substrate SUB on a stage ST. An inspection may then be performed for defects in the pattern using reflected beams RLA generated as a second laser beam LA2 irradiated onto and then reflected from the pattern. The substrate SUB may be a display substrate, a touch substrate, or another kind of substrate.

The patterning apparatus 100 may include a laser generation unit 110, a beam distribution unit 120, a lens unit 130, a detection unit 140, and a control unit 150. In some embodiments, the laser generation unit 110, the beam distribution unit 120, and the lens unit 130 may be on the same axis.

The laser generation unit 110 may generate a first laser beam LA1 and a second laser beam LA2. The first laser beam LA1 may have an intensity for forming a pattern in the substrate SUB. The second laser beam LA2 may have an intensity which does not form a pattern in the substrate SUB. Therefore, the first laser beam LA1 may have an intensity higher than that of the second laser beam LA2. Each of the first and second laser beams LA1 and LA2 may have a single wavelength or multiple wavelengths.

The beam distribution unit 120 may receive an incident laser beam and/or may allow a beam to be reflected in a direction different from the incident direction. For example, the beam distribution 120 may provide the first and second laser beams LA1 and LA2 emitted from the laser generation unit 110 to the lens unit 130 on the same axis as the beam distribution unit 120. Also, the beam distribution unit 120 may allow a reflected beam RLA emitted from the lens unit 130 to the detection unit 140.

The lens unit 130 may irradiate the first and second laser beams LA1 and LA2 from the beam distribution unit 120 onto the substrate SUB. Also, the lens unit 120 may condense reflected beams RLA that are generated as the first and second laser beams LA1 and LA2 are reflected from the substrate SUB, and may provide the condensed reflected beams RLA to the beam distribution unit 120. The lens unit 130 may be spaced apart from the substrate SUB at a predetermined distance.

The lens unit 130 may include, for example, a focusing lens that irradiates the first and second laser beams LA1 and LA2 onto the substrate SUB, and condenses reflected beams RLA generated as the first and second laser beams LA1 and LA2 are reflected from the substrate SUB. The lens unit 130 may also have a transfer member (e.g., a galvanometer) that transfers the focusing lens. For example, the lens unit 130 may have a structure in which the focusing lens is mounted in the galvanometer and which may be rotated at a set angle and speed on the substrate SUB.

The lens unit 130 may irradiate the first and second laser beams LA1 and LA2 onto the same area on the substrate SUB. Routes or optical paths through which the first and second laser beams LA1 and LA2 are emitted from the laser generation unit 110 and reach the lens unit 130 may be identical to each other.

In one embodiment, periods of time during which the first and second laser beams LA1 and LA2 are irradiated onto the substrate SUB may be different from each other. For example, the lens unit 130 may irradiate the first laser beam LA1 onto a first area to form a pattern in the first area, and may irradiate the second laser beam LA2 to inspect for defects in the pattern.

The lens unit 130 may condense reflected beams RLA generated as the second laser beam LA2 is reflected from the substrate SUB, and may provide the condensed reflected beams RLA to the beam distribution unit 120.

A series of processes in which the lens unit 130 irradiates the first and second laser beams LA1 and LA2 onto the substrate SUB and condenses the reflected beams RLA may be performed, for example, in a state in which the lens unit 130 is fixed.

In one embodiment, the patterning apparatus 100 may irradiate the second laser beam LA2 onto second areas adjacent to the first area onto which the first laser beam LA1 is irradiated. The patterning apparatus 100 may then collect reflected beams RLA as the second laser beam LA2 is reflected from the second areas, thereby detecting the position at which a pattern is formed.

The detection unit 140 may convert the reflected beams RLA received by the beam distribution unit 120 to electrical signals ES. The converted electrical signals ES may be provided to the control unit 150. In some embodiments, the detection unit 140 may include a photo diode.

The control unit 150 may detect the position of a pattern or a pattern image based on the electrical signals ES from the detection unit 140. In some embodiments, the detection unit 140 may generate the pattern image in the form of a raster image.

The control unit 150 may inspect for defects, etc., of the pattern by analyzing the shape, size, and/or other attributes of the pattern, obtained by analyzing the pattern image. For example, the controller 150 may determine whether the pattern has been successfully formed by comparing the shape, size, and/or other attributes of the pattern in the pattern image with shapes, sizes and/or other attributes of a predetermined or reference pattern.

In FIG. 1, control unit 150 is implemented in the patterning apparatus 100. In another embodiment, the controller 150 may be implemented as a separate device.

In one type of patterning apparatus that has been proposed, a pattern image is generated using a separate image photographing device (e.g., a charge-coupled device (CCD) camera) for purposes of inspecting for defects of a pattern. However, in this type of patterning apparatus, the image photographing device must be moved onto the pattern in order to generate the pattern image. Thus, it is difficult to immediately determine the existence of defects in the pattern after the pattern is formed. In addition, a distortion phenomenon caused by a lens of the image photographing device may exist. Also, a precise aligning process is performed to position the image photographing device on the pattern so that a pattern image can be generated.

However, in the patterning apparatus 100 according to the present embodiment, a series of processes are performed which including irradiating the first and second laser beams LA1 and LA2 from the lens unit 130 onto the substrate SUB and condensing the reflected beams RLA in a state where the lens unit 130 is at a fixed position. Thus, a pattern may be formed by irradiating the first laser beam LA1, and then irradiating the second laser beam LA2, without requiring a separate movement of the lens unit 130. As a result, defects and other attributes of the pattern may be more quickly, and even immediately, determined.

In addition, the first laser beam LA1 for forming the pattern and the second laser beam LA2 and reflected beams RLA for inspecting a defect of the pattern may use the same component (e.g., the lens unit 130). Hence, the distortion phenomenon caused by the lens may be reduced or prevented. In addition, the first and second laser beams LA1 and LA2 are coaxially irradiated onto the substrate SUB when the lens unit 130 is fixed. Hence, a separate aligning process for generating a pattern image is not required.

In FIG. 1, a defect of a pattern is inspected by condensing the reflected beams RLA, which are generated as the second laser beam LA2 is reflected from the substrate SUB. In one embodiment, the patterning apparatus 100 may irradiate a first laser beam LA1 onto a test substrate, condense reflected beams RLA generated as the first laser beam LA1 is reflected from the test substrate, and inspect the shape, intensity, and/or other attribute of the first laser beam LA1 using the reflected beams RLA. In this manner, the patterning apparatus 100 may irradiate a second laser beam LA2 onto the test substrate, and inspect the shape, intensity, or other attribute of the second laser beam LA2 using reflected beams RLA, which are generated as the second laser beam LA2 is reflected from the test substrate.

Figure 2A:
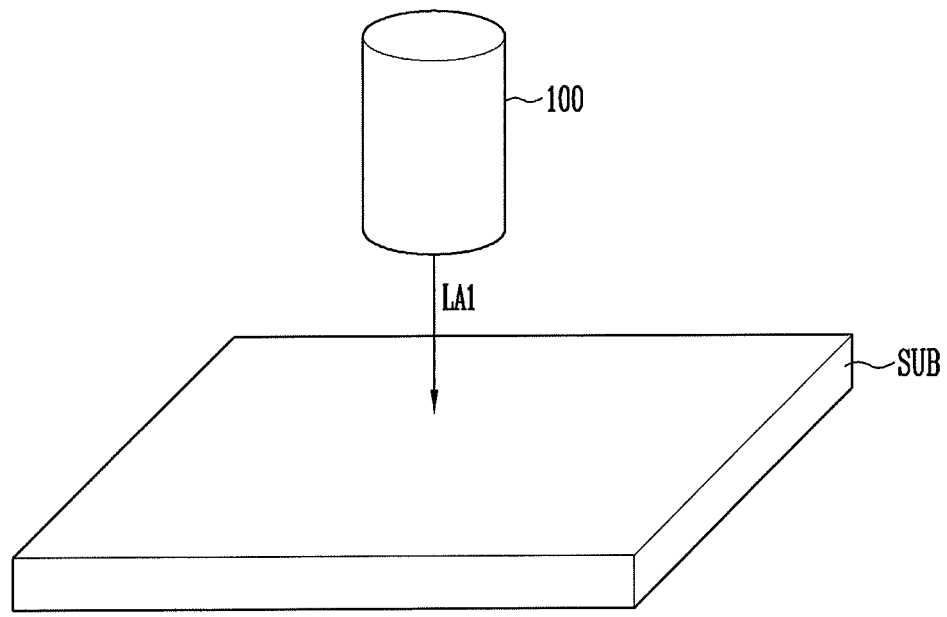
FIGS. 2A-2D illustrate an embodiment of a method for operating a patterning apparatus.

FIGS. 2A-2D illustrate an embodiment of a method for operating a patterning apparatus, which, for example, may be patterning apparatus 100. Referring to FIG. 2A, the patterning apparatus 100 may irradiate a first laser beam LA1 onto a substrate SUB to form a pattern PT.

The patterning apparatus 100 may irradiate the first laser beam LA1 in a state in which the patterning apparatus 100 is spaced apart from the substrate SUB at a predetermined distance. In some embodiments, the patterning apparatus 100 may irradiate the first laser beam LA1 in a state in which the patterning apparatus 100 is in contact with the substrate SUB.

The patterning apparatus 100 may irradiate the first laser beam LA1 in a direction perpendicular to the substrate SUB. In some embodiments, the patterning apparatus 100 may irradiate the first laser beam LA1 in a direction obliquely inclined with respect to the substrate SUB.

In FIG. 2A, the patterning apparatus 100 irradiates a single first laser beam LA1 onto the substrate SUB. In one embodiment, the patterning apparatus 100 may simultaneously irradiate a bundle of first laser beams LA1 onto the substrate SUB. The patterning apparatus 100 may simultaneously irradiate the bundle of first laser beams LA1 in a single direction or multiple directions. For example, the patterning apparatus 100 may irradiate all of the bundle of first laser beams LA1 in a first direction. In one embodiment, the patterning apparatus 100 may irradiate a portion of the bundle of first laser beams LA1 in the first direction and may irradiate the rest of the bundle of first laser beams LA1 in a second direction intersecting the first direction.

Figure 2B:
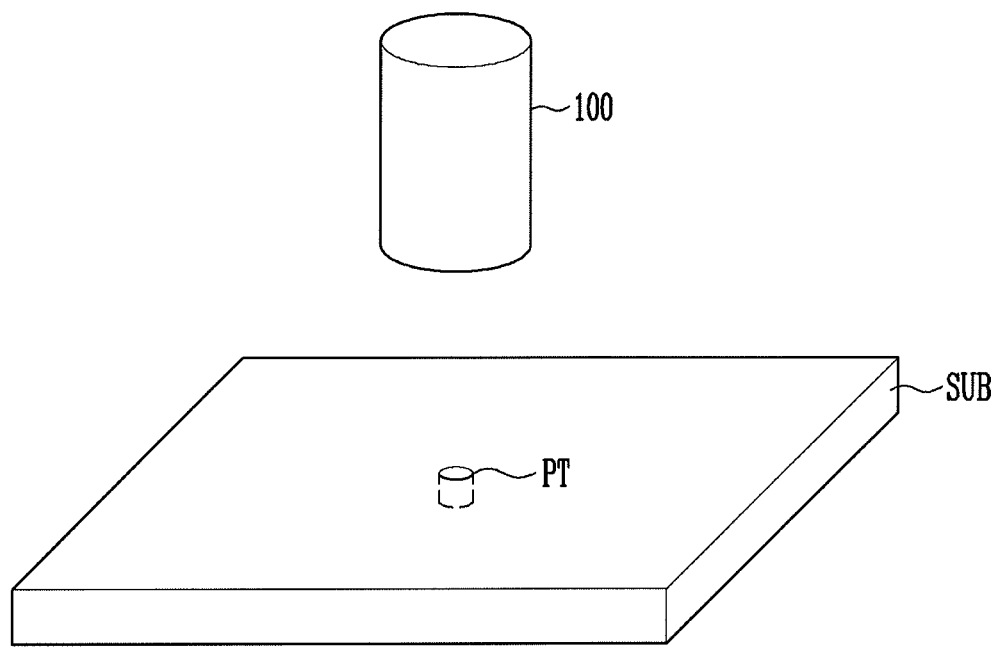

Referring to FIG. 2B, the pattern PT may be formed in the substrate SUB by the first laser beam LA1. In FIG. 2B, the pattern PT is formed in a cylindrical shape. In one embodiment, the shape of the pattern PT may be different depending, for example, on the manner in which the first laser beam LA1 is irradiated. For example, when the substrate SUB is viewed on a plane, the pattern PT may have a shape such as but not limited to a circle, an ellipse, a shape having curved sides, a semicircle, a semi-ellipse, etc., including linear and curved sides, a closed-shape polygon including linear sides, or another shape.

Figure 2C:
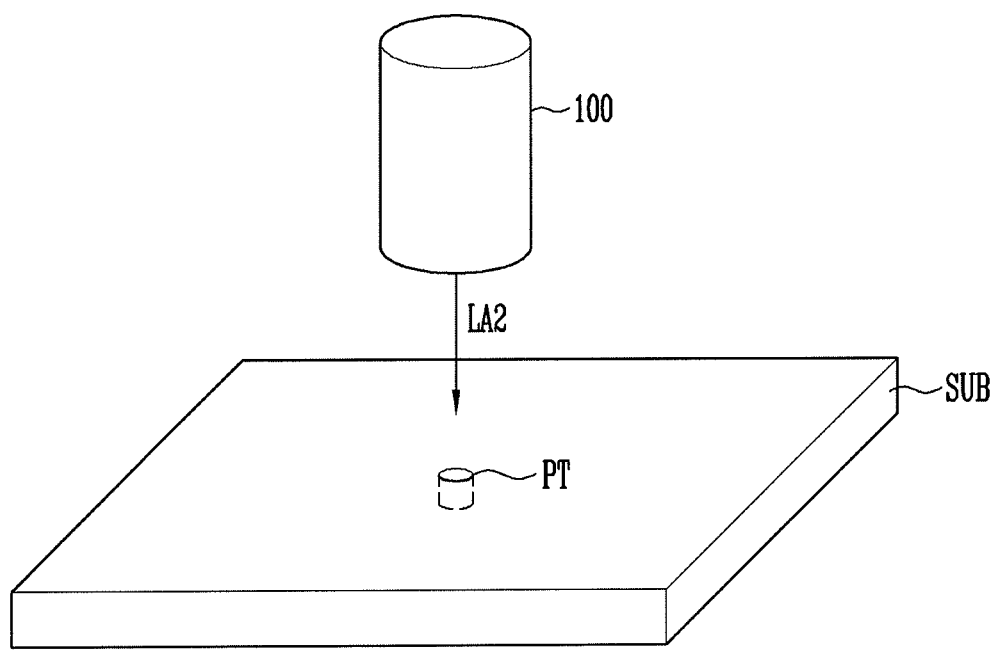

Referring to FIG. 2C, the patterning apparatus 100 may irradiate a second laser beam LA2 onto the substrate SUB for inspecting a defect or other attribute of the pattern PT. The patterning apparatus 100 may irradiate the second laser beam LA2 when the patterning apparatus 100 is fixed after the first laser beam LA1 is irradiated. As a result, the second laser beam LA2 may be irradiated onto a position where the pattern PT is formed.

The patterning apparatus 100 may irradiate the second laser beam LA2 onto the substrate SUB when the patterning apparatus 100 is spaced apart from the substrate SUB at a predetermined distance. In some embodiments, the patterning apparatus 100 may irradiate the second laser beam LA2 when the patterning apparatus 100 is in contact with the substrate SUB. In addition, the pattern apparatus 100 may irradiate the second laser beam LA2 onto the substrate SUB in the direction perpendicular to the substrate SUB. When the first laser beam LA1 is irradiated in a direction obliquely inclined with respect to the substrate SUB, the second laser beam LA2 may be irradiated in the same direction as that in which the first laser beam LA1 is irradiated.

Figure 2D:
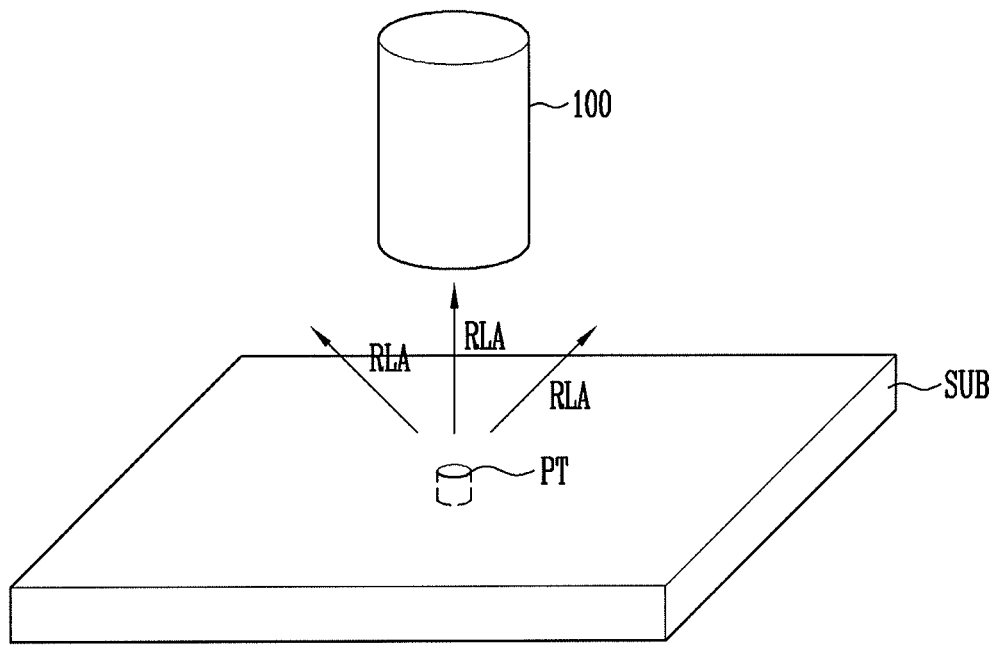

Referring to FIG. 2D, when the second laser beam LA2 is irradiated onto the substrate SUB, the second laser beam LA2 may be scattered or reflected in various directions. The patterning apparatus 100 may condense reflected beams RLA generated as the second laser beam LA2 is reflected. The patterning apparatus 100 may convert the condensed reflected beams RLA into electrical signals and generate a pattern image using the electrical signals ES. In addition, the patterning apparatus 100 may inspect the shape, size, and/or other attribute of the pattern PT by analyzing the pattern image and determining existence of a defect or other attribute of the pattern PT based on the inspected result.

Figure 3:
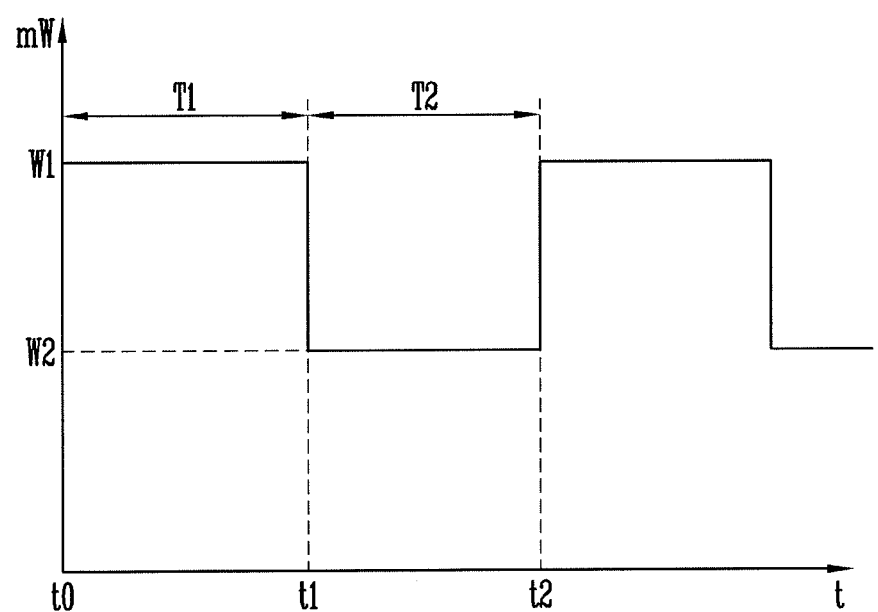
FIG. 3 illustrates an example of changes in intensity of a laser beam.

FIG. 3 illustrates an example of changes in intensity of a laser beam output from the patterning apparatus 100. The patterning apparatus 100 may output the laser beam having a first intensity W1 during a first period T1, and may output the laser beam having a second intensity W2 during a second period T2. For example, the patterning apparatus 100 may irradiate the first laser beam LA1 onto the substrate SUB during the first period T1 (that is a period from an initial time t0 to a first time t1) and may irradiate the second laser beam LA2 onto the substrate SUB during the second period T2 (that is a period from the first time t1 to a second time t2).

In FIG. 3, the first period T1 in which the first laser beam LA1 is output and the second period T2 in which the second laser beam LA2 is out are continuously repeated. In one embodiment, the patterning apparatus 100 may discontinuously output the first and second laser beams, e.g., a blank period in which any laser beam is not output may be inserted between the first period T1 and the second period T2.

In addition, the intensity of the first laser beam LA1 output during the first period T1 is fixed to the first intensity W1 and the intensity of the second laser beam LA2 output during the second period T2 is fixed to the second intensity W2. In one embodiment, the patterning apparatus 100 may adjust the intensity of the first laser beam LA1 by considering the shape, size, depth, and/or other attribute of the pattern PT. Intensities of the first laser beam LA1 output during the repeated first periods T1 may be different from each other.

The patterning apparatus 100 may output the second laser beam LA2 having the second intensity W2 during the second period T2. In one embodiment, the patterning apparatus 100 may adjust the intensity of the second laser beam LA2, corresponding to the intensity of the first laser beam LA1. Thus, intensities of the second laser beam LA2 output during the repeated second periods T2 may be different from each other.

Figure 4:
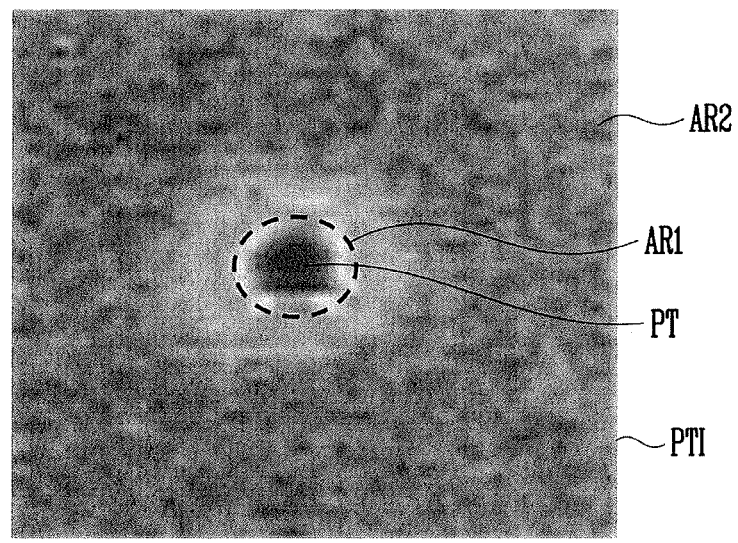
FIG. 4 illustrates an example of an image generated by a patterning apparatus according to an embodiment.

FIG. 4 illustrates an example of an image generated by the patterning apparatus 100. The image includes a pattern image PTI that is generated based on reflected beams received by the patterning apparatus 100. The patterning apparatus 100 may generate the pattern image PTI by converting reflected beams RLA into electrical signals ES and converting the electrical signals ES into images in units of pixels. The pattern image PTI may be, for example, a raster image and may be a set of square pixels. In another embodiment, the pattern image PTI may be an image different from a raster image.

The pattern image PTI has a first area AR1 which includes a pattern PT. The first area AR1 may have a brightness distribution different from a second area AR2 of the pattern image PTI. The patterning apparatus 100 may analyze the shape, size, and/or another attribute of the pattern PT in the pattern image PTI, and may perform an inspection to determine the existence of a defect of the pattern PT by comparing the shape, size, and/or attributes of the pattern PT with the shape, size, and/or attributes of a target pattern PT. The pattern image PTI shown in FIG. 4 is a raster image. In another embodiment, the pattern image PTI may be an image different from a raster image.

Figure 5A:
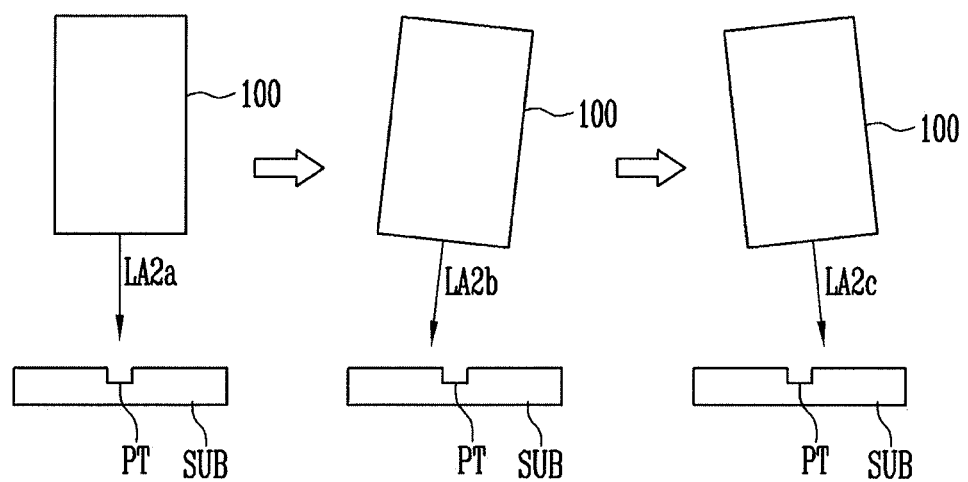
FIGS. 5A-5C illustrate other embodiments of a method for operating a patterning apparatus.
Figure 5B:
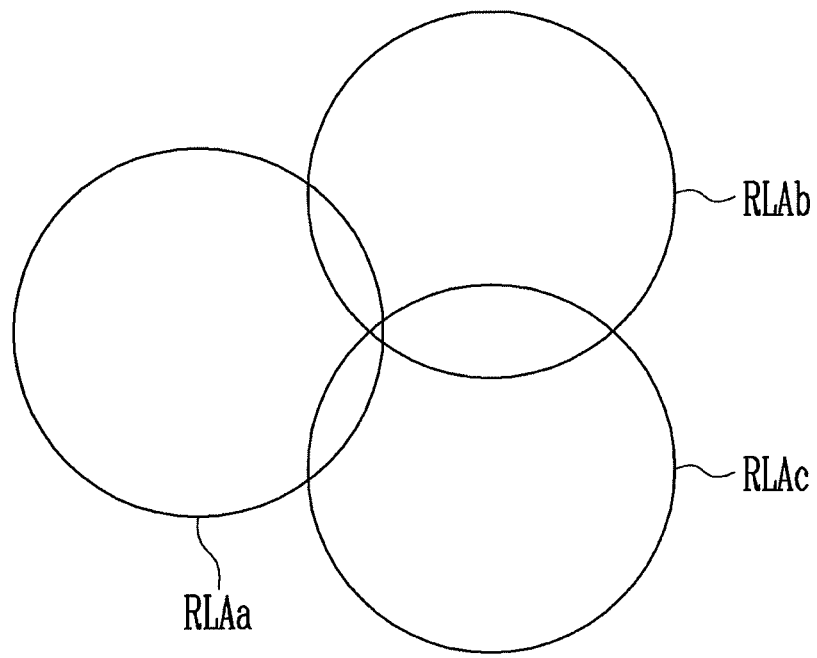
Figure 5C:
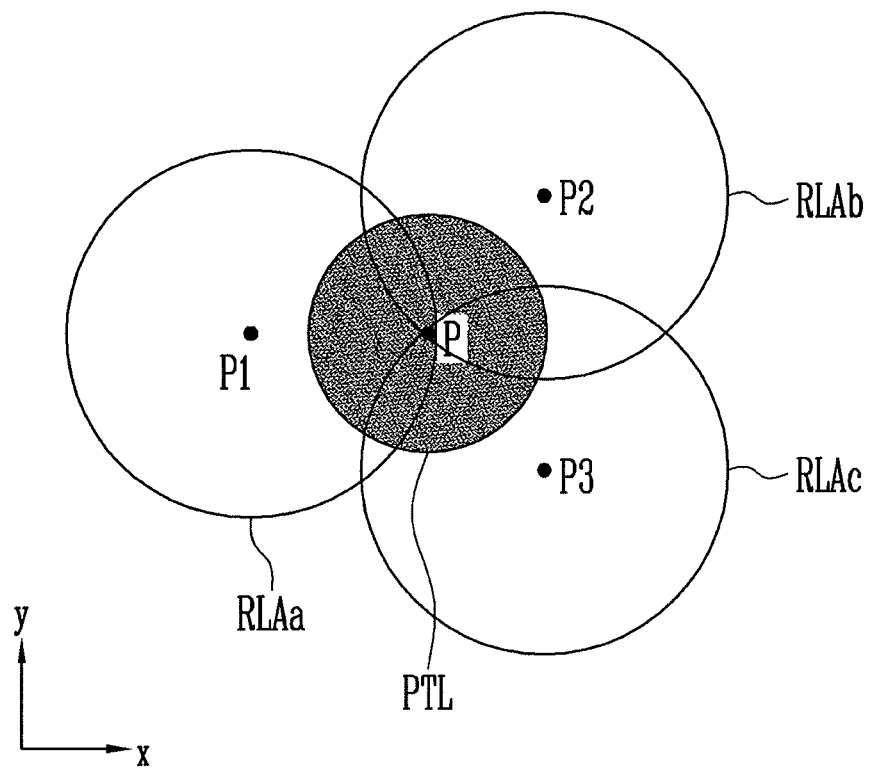

FIGS. 5A-5C illustrate additional embodiments of a method for operating a patterning apparatus, which, for example, may be the patterning apparatus 100. Referring to FIG. 5A, the patterning apparatus 100 may irradiate (2-1)th to (2-3)th laser beams LA2a, LA2b, and LA2c in various directions and inspect whether the position of a target pattern PT corresponds an actual pattern PT position. As described in FIGS. 2A-2D, when the patterning apparatus 100 coaxially irradiates first and second laser beams LA1 and LA2 and generates a pattern image PTI using reflected beams RLA generated as the second laser beam LA2 is reflected, the position at which a pattern PT is formed and a defect or other attribute of the pattern PT may be precisely inspected.

In one embodiment, the patterning apparatus 100 may irradiate the (2-1)th to (2-3)th laser beams LA2a, LA2b, and LA2c in various directions to more rapidly detect the position at which the pattern PT is formed. For example, the patterning apparatus 100 may irradiate the (2-1)th to (2-3)th laser beams LA2a, LA2b, and LA2c in a direction different from that in which the first laser beam LA1 is irradiated. A first area on a substrate SUB onto which the first laser beam LA1 is irradiated and second areas on the substrate SUB onto which the (2-1)th to (2-3)th laser beams LA2a, LA2b, and LA2c are irradiated may be adjacent to each other.

A case where only the (2-1)th to (2-3)th laser beams LA2a, LA2b, and LA2c are irradiated onto the substrate SUB is illustrated in FIG. 5A. In one embodiment, the patterning apparatus 100 may irradiate the second laser beam LA2 onto the substrate SUB at various angles p (p is a natural number greater than 1) times.

Referring to FIG. 5B, first to third reflected beams RLAa, RLAb, and RLAc, which are respectively generated as the (2-1)th to (2-3)th laser beams LA2a, LA2b, and LA2c, are reflected from the substrate SUB.

The patterning apparatus 100 may calculate positions at which the (2-1)th to (2-3)th laser beams LA2a, LA2b, and LA2c are reflected from the substrate SUB, e.g., positions at which the first to third reflected beams RLAa, RLAb, and RLAc are generated by considering the movement, rotation, or other attribute of the lens unit 130.

In FIG. 5B, the first to third reflected beams RLAa, RLAb, and RLAc overlap with each other. In one embodiment, the first to third reflected beams RLAa, RLAb, and RLAc may be spaced apart from each other. In one embodiment, some of the first to third reflected beams RLAa, RLAb, and RLAc may overlap with each other, and remaining ones of the first to third reflected beams RLAa, RLAb, and RLAc may be spaced part from each other.

Referring to FIG. 5C, the patterning apparatus 100 may measure intensities of the first to third reflected beams RLAa, RLAb, and RLAc by converting the first to third reflected beams RLAa, RLAb, and RLAc into electrical signals ES. The patterning apparatus 100 may calculate coordinates of the first to third reflected beams RLAa, RLAb, and RLAc on the substrate SUB based on the movement, rotation, and/or other attributes of the lens unit 130.

The patterning apparatus 100 may detect a position PTL of the pattern based on the intensities and coordinates of the first to third reflected beams RLAa, RLAb, and RLAc. For example, the patterning apparatus 100 may calculate a first coordinate P1 of the first reflected beam RLAa, a second coordinate P2 of the second reflected beam RLAb, and a third coordinate P3 of the third reflected beam RLAc, and may then calculate the position PTL of the pattern by respectively applying (or based on) the intensities of the first to third reflected beams RLAa, RLAb, and RLAc to the coordinates.

In accordance with one embodiment, the patterning apparatus 100 may calculate the position PTL of the pattern based on the following equations.

$$x_c = \frac{\sum_{n=1}^{i} x_n \cdot \text{Image}(x_n, y_n)}{\sum_{n=1}^{i} \text{Image}(x_n, y_n)}$$

$$y_c = \frac{\sum_{n=1}^{i} y_n \cdot \text{Image}(x_n, y_n)}{\sum_{n=1}^{i} \text{Image}(x_n, y_n)}$$

In these equations, $x_c$ and $y_c$ respectively denote an x-axis coordinate and a y-axis coordinate with respect to the position PTL of the pattern, $x_n$ and $y_n$ respectively denote an x-axis coordinate and a y-axis coordinate of an nth reflected beam (n is a natural number), and Image($x_n$, $y_n$) denotes an intensity of the nth reflected beam.

The position PTL of the pattern may be determined as a coordinate P of the pattern including the x-axis coordinate $x_c$ and the y-axis coordinate $y_c$. For example, the position PTL of the pattern shown in FIG. 5C may be calculated as follows.

$$x_c = \frac{x_1 \cdot \text{Image}(x_1, y_1) + x_2 \cdot \text{Image}(x_2, y_2) + x_3 \cdot \text{Image}(x_3, y_3)}{\text{Image}(x_1, y_1) + \text{Image}(x_2, y_2) + \text{Image}(x_3, y_3)}$$

$$y_c = \frac{y_1 \cdot \text{Image}(x_1, y_1) + y_2 \cdot \text{Image}(x_2, y_2) + y_3 \cdot \text{Image}(x_3, y_3)}{\text{Image}(x_1, y_1) + \text{Image}(x_2, y_2) + \text{Image}(x_3, y_3)}$$

In these equations, $x_1$ and $y_1$ respectively denote an x-axis coordinate and a y-axis coordinate of the first reflected beam RLAa, $x_2$ and $y_2$ respectively denote an x-axis coordinate and a y-axis coordinate of the second reflected beam RLAb, and $x_3$ and $y_3$ respectively denote an x-axis coordinate and a y-axis coordinate of the third reflected beam RLAb. In addition, Image($x_1$, $y_1$), Image($x_2$, $y_2$), and Image($x_3$, $y_3$) respectively denote intensities of the first to third reflected beams RLAa, RLAb, and RLAc.

The patterning apparatus 100 may determine the position PTL of the pattern as a coordinate ($x_c$, $y_c$), using the above-described equations.

In one embodiment, the patterning apparatus 100 measures intensities of reflected beams and calculate coordinates of the reflected beams, so that the position PTL of a pattern may be rapidly and accurately detected without generating a separate pattern image PTI. Also, in the another embodiment, the patterning apparatus 100 may irradiate the second laser beam LA2 a reduced or minimum number of times according to an operation mode thereof, and may detect the position of a pattern PT using a reduced or minimum number of reflected beams. Also, in the another embodiment, the patterning apparatus 100 may irradiate a plurality of second laser beams LA2 according to an operation mode thereof, which may result in a more accurate detection of the position of a pattern PT using a plurality of reflected beams.

FIG. 6 illustrates another embodiment of a method for operating the pattern apparatus, which, for example, may be the patterning apparatus 100. Referring to FIG. 6, the patterning apparatus 100 may form a pattern PT by irradiating a first laser beam LA1 onto a substrate SUB (S100). In addition, the patterning apparatus 100 may irradiate a second laser beam LA2 having an intensity different from that of the first laser beam LA1 onto the substrate SUB (S110). The patterning apparatus 100 may condense reflected beams RLA generated as the second laser beam LA2 is reflected from the substrate SUB (S120).

The patterning apparatus 100 may convert the reflected beams RLA to electrical signals ES, and inspect for defects or other attributes of the pattern PT based on the electrical signals ES (S130). The patterning apparatus 100 may generate a pattern image PTI based on the electrical signals ES or may detect a position PTL of the pattern.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The control units and other signal generating and signal processing features of the embodiments disclosed herein may be implemented in logic which, for example, may include hardware, software, or both. When implemented at least partially in hardware, the control units and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the control units and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

In accordance with one or more of the aforementioned embodiments, a patterning apparatus and method for operating a patterning apparatus may form a pattern by irradiating a first laser beam. A second laser beam is then irradiated without separate movement of the patterning apparatus so that a defect and/or other attribute of the pattern may be immediately determined. Also, the first laser beam for forming the pattern and the second laser beam for inspecting a defect of the pattern may use the same component. Hence, error caused by a distortion phenomenon of the lens may be reduced or prevented.

Also, the first and second laser beams may be coaxially irradiated on the substrate. Thus, a separate aligning process for generating a pattern image is not required. Also, intensities of reflected beams and coordinates of the reflected beams may be calculated. As a result, the position of a pattern may be rapidly and accurately detected without generating a separate pattern image.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A patterning apparatus, comprising:
   a laser generator to generate a first laser beam and a second laser beam having different intensities;
   at least one lens to irradiate the first laser beam during a first period to form a pattern in a substrate, to irradiate the second laser beam during a second period after the first period to determine a defect of the pattern formed in the substrate, and to condense reflected beams generated as the second laser beam is reflected from the substrate;
   a detector to convert the reflected beams to electrical signals; and
   a controller to determine a defect of the pattern based on the electrical signals,
   wherein the first laser beam has an intensity greater than the second laser beam.

2. The patterning apparatus as claimed in 1, wherein the at least one lens is between the substrate and a beam distribution unit, and reflected beams are generated as the second laser beam is reflected from the substrate toward the at least one lens.

3. The patterning apparatus as claimed in 1, wherein the first and second laser beams are emitted from the laser generator alternately.

4. The patterning apparatus as claimed in 1, wherein the at least one lens is to irradiate the first and second laser beams along a same optical path.

5. The patterning apparatus as claimed in 1, wherein the at least one lens is to irradiate the first laser beam onto the substrate during the first period and is to irradiate the second laser beam onto the substrate during the second period different from the first period, the first and second periods being alternate and continuous with each other.

6. The patterning apparatus as claimed in 1, wherein the at least one lens is to irradiate the first laser beam and the second laser beam at a same position on the substrate.

7. The patterning apparatus as claimed in 1, wherein the at least one lens is to irradiate the second laser beam onto each of a plurality of second areas adjacent to a first area on the substrate onto which the first laser beam is irradiated.

8. The patterning apparatus as claimed in 7, wherein the detector is to convert first reflected beams generated as the second laser beam is reflected from the second areas to first electrical signals with respect to the second areas.

9. The patterning apparatus as claimed in 8, wherein the controller is to measure intensities of the first reflected beams based on the first electrical signals, and is to detect a position of the pattern based on position coordinates of the second areas and the intensities of the first reflected beams.

10. The patterning apparatus as claimed in 1, wherein the detector includes a photo diode.

11. The patterning apparatus as claimed in 1, wherein the controller is to generate an image based on the electrical signals and is to determine the defect of the pattern by analyzing the image.

12. The patterning apparatus as claimed in 11, wherein the image is a raster image.

13. The patterning apparatus as claimed in 1, further comprising a beam distributor to transmit the first and second laser beams emitted from the laser generator to the at least one lens, to refract the reflected beams emitted from the at least one lens, and to output the refracted reflected beams to the detector.

14. A method for operating a patterning apparatus, the method comprising:
during a first period, irradiating a first laser beam to form a pattern in a substrate;
during a second period after the first period, irradiating a second laser beam onto the pattern formed in the substrate, the first and second laser beams having different intensities;
condensing reflected beams generated as the second laser beam is reflected from the substrate;
converting the reflected beams to electrical signals; and
inspecting a defect of the pattern based on the electrical signals,
wherein the first laser beam has an intensity greater than the second laser beam.

15. The method as claimed in 14, wherein irradiating the first and second laser beams includes irradiating the first and second laser beams alternately onto the substrate, such that only one of the first and second laser beams is incident on the substrate at a time.

16. The method as claimed in 15, wherein irradiating the first and second laser beams includes irradiating the first and second laser beams on a same axis.

17. The method as claimed in 16, wherein the second laser beam is irradiated onto each of a plurality of second areas adjacent to a first area on the substrate onto which the first laser beam is irradiated.

18. The method as claimed in 17, further comprising:
generating an image with respect to the first area based on the electrical signals, wherein inspecting the defect includes analyzing the image.

19. The method as claimed in 14, wherein:
first reflected beams are generated as the second laser beam is reflected from second areas and are converted to first electrical signals with respect to the second areas, and
irradiating the first and second laser beams includes irradiating the first and second laser beams from a same light source and through a same lens before the first and second laser beams are incident onto the substrate.

20. The method as claimed in 17, wherein:
first reflected beams are generated as the second laser beam is reflected from the second areas, and are converted to first electrical signals with respect to the second areas,
intensities of the first reflected beams based on the first electrical signals are measured, and
a position of the pattern based on position coordinates of the second areas and the intensities of the first reflected beams are detected.

* * * * *